United States Patent [19]

Iwamoto et al.

[11] Patent Number: 5,287,430
[45] Date of Patent: Feb. 15, 1994

[54] SIGNAL DISCRIMINATION DEVICE USING NEURAL NETWORK

[75] Inventors: Masafumi Iwamoto; Takamitsu Okada; Takahiko Fujisaka; Michimasa Kondoh, all of Kamakura, Japan

[73] Assignee: Mirsubishi Denki Kabushiki Kaisha, Tokyo, Japan

[21] Appl. No.: 868,460

[22] Filed: Apr. 14, 1992

[30] Foreign Application Priority Data

Apr. 15, 1991 [JP] Japan .................................. 3-082330

[51] Int. Cl.⁵ ......................... G06F 15/18; H03M 1/00
[52] U.S. Cl. ......................................... 395/22; 395/23; 382/14
[58] Field of Search ............... 395/22, 20, 23; 382/14, 382/15

[56] References Cited

U.S. PATENT DOCUMENTS

| | | | |
|---|---|---|---|
| 3,576,976 | 5/1971 | Russo et al. ........................... | 395/22 |
| 4,876,731 | 10/1989 | Loris et al. ............................ | 395/21 |
| 4,945,494 | 7/1990 | Penz et al. ............................. | 395/23 |
| 4,954,963 | 9/1990 | Penz et al. ............................. | 395/23 |
| 5,138,924 | 8/1992 | Ohya et al. ............................ | 395/22 |

OTHER PUBLICATIONS

"Radial Basis Function Classification of Pulse Radar Waveforms" C. Vrckovnik, C. R. Carter, S. Haykin Jun. 17-21, 1990.

*Primary Examiner*—Michael R. Fleming
*Assistant Examiner*—Stuart Shapiro
*Attorney, Agent, or Firm*—Wolf, Greenfield & Sacks

[57] ABSTRACT

A signal discrimination device using a neural network for discriminating input signals such as radar reception signals includes an adaptive code generator means for generating codes for representing the discrimination categories. The distances between the codes for closely related categories are smaller than the distances between the codes for remotely related categories. During the learning stage, the neural network is trained to output the codes for respective inputs. The discrimination result judgment means determines the categories by comparing the outputs of the neural network and the codes for the respective categories.

7 Claims, 9 Drawing Sheets

SIGNAL DISCRIMINATION DEVICE USING NEURAL NETWORK

BACKGROUND OF THE INVENTION

This invention relates to signal discrimination devices for discriminating input signals, such as radar reception signals, by means of neural networks.

It is an important technical problem to discriminate the species of an object from the radar reception signals. The values which are representative of certain features of the observed object are calculated, and, on the basis of these values, the observed object is discriminated into classes or categories, such as the categories of the surface of the earth, the surface of the sea, and a form of an airplane.

In the case of the conventional signal discrimination devices using neural networks, the codes for representing the discrimination categories are usually determined without any reference to the values of the parameters representing the categories.

For example, G. Vrckovnik, C. R. Carter, S. Haykin: "Radial Basis Function Classification of Impulse Radar Waveforms", Proceedings of International Joint Conference on Neural Networks, Vol. 1, pp. 45 through 50, San Diego, 1990 (referred to hereinafter as article (1)) shows a discrimination method using a neural network by which radar waveforms from asphalt covered bridge decks are classified into three categories: two-lift asphalt over concrete over rebars (2ACR); two-lift asphalt over a waterproofing membrane over concrete over rebars (2AMCR); and three-lift asphalt over concrete over rebars (3ACR).

FIG. 5 is a block diagram showing the structure of a conventional signal discrimination device using a neural network. FIG. 6 is a diagram showing the structure of the neural network. FIG. 7 is a diagram showing the relationship of the inputs and an output component of the neural network. FIG. 8 is a flowchart showing the procedure by which the codes for respective categories are generated in the code generator means of FIG. 5. FIG. 9 is a flowchart showing the procedure by which the discrimination result judgment means of FIG. 5 discriminates the categories in response to the outputs of the neural network. The structures and the procedures shown in these figures are those inferred from the disclosure of the above article (1).

As shown in FIG. 5, the input data for discrimination 2 and the input data for learning 3 are coupled selectively to the neural network 8 via a learning/discrimination change-over switch 7. The output of a code generator means 11 is selectively coupled to the neural network 8 and the discrimination result judgment means 9 via a switch interlocked with the learning/discrimination change-over switch 7. The output of the discrimination result judgment means 9 are stored in a data file for discrimination result judgement 4.

As shown in FIG. 6, the neural network 8 includes: an input layer 22 consisting of a plurality of input nodes or input elements; an intermediate layer 23 consisting of intermediate nodes 21 provided with respective weights; and an output layer 24 consisting of output elements 20.

The output (0) 31 of each output node 28 of the neural network 8 is generated as shown in FIG. 7. Namely, a plurality of input data, $i_1, i_2, i_3, ---, i_M$ applied to the input nodes 27 are weighted by the respective weights 29, $w_1, w_2, w_3, ---, w_M$. The weighted sum of inputs:

$$x = \sum_{j=1}^{M} w_j i_j$$

is calculated by the summation means 25.

Then, the output data 31 is calculated by means of the conversion function 26: and is output from each output node 28.

Next, the operation of the signal discrimination device of FIGS. 5 through 7 is described. It is assumed that the inputs are classified into three categories: (1) two-lift asphalt over a waterproofing membrane over concrete over rebars (2AMCR); (2) two-lift asphalt over concrete over rebars (2ACR); and (3) three-lift asphalt over concrete over rebars (3ACR).

First, the code generator means 11 determines the codes of the respective categories as shown in TABLE 1 in accordance with the procedure shown in FIG. 8.

TABLE 1

| category | code |
| --- | --- |
| 2AMCR | 100 |
| 3ACR | 010 |
| 2ACR | 001 |

At step S60 in FIG. 8, the code length L of the output of the neural network 8 is set equal to the number N of classification categories into which the inputs are to be classified via the neural network 8. Then, at step S61, the components $C_{ij}$ (where j ranges from 1 to the code length L) of the code $C_i$ for the ith category are set by:

$$C_{ij} = 0 \text{ if } i \neq j$$
$$\phantom{C_{ij} =} 1 \text{ if } i = j$$

Thus, the codes for the respective categories are determined as shown in TABLE 1. Each code is determined under the assumption that only one of its components takes the value 1.

Next, the learning/discrimination change-over switch 7 is switched to the learning side to train the neural network 8. By means of this learning or training procedure, the neural network 8 learns to output the codes as shown in TABLE 1 for respective categories in response to the input data for learning. The neural network 8 receives sets of input data for learning 3 and the codes corresponding thereto as shown in TABLE 1 generated by the code generator means 11. (Each set of the input data for learning 3 consists of a number of sample values composing a radar reception signal waveform.) In response to the sets of the input data for learning 3 and the codes corresponding thereto, the neural network 8 modifies the weights of the intermediate nodes 21 in accordance with the well-known error back propagation algorithm or the radial basis function algorithm described in the above article (1). After the modification of the weights of the intermediate nodes 21 is completed, the neural network 8 is trained to output the codes $C_i$ as shown in TABLE 1 for the respective categories in response to the input data for learning 3.

When the learning is completed, the learning/discrimination change-over switch 7 is switched to the discrimination side to discriminate or classify each set of input data for discrimination 2 into the categories (1) through (3). (Each set of the input data for discrimination 2 consists of a number of samples of a radar reception signal waveform) thus, in response to the input data for discrimination 2, the neural network 8 outputs signals each consisting of three values approximately equal to the codes $C_i$ for the respective categories. These outputs of the neural network 8 are generated via the data conversion shown in FIG. 7. The discrimination result judgment means 9 receives the output codes of the neural network 8 and the codes generated by the code generator means 11, and determines the category or classification of each set of the input data for discrimination 2.

FIG. 9 is a flowchart showing the procedure by which the discrimination result judgment means of FIG. 5 discriminates the categories in response to the outputs of the neural network. At step S50, a neural network output O (consisting of three values) and the codes $C_i$ (i=1 through N) for respective categories as shown in TABLE 1 are input to the discrimination result judgment means 9. Next, at step S51, the discrimination result judgment means 9 determines the distance $D_i$ (i=1 through N):

$$D_i = \sum_{j=1}^{L} |O_j - C_{ij}|$$

where $O_j$ is the output value of the jth element of the output elements 20 of the neural network 8, $C_{ij}$ is the jth component of the $C_i$.

Then, at step S52, the discrimination result judgment means 9 determines the minimum $D_I$ among the $D_i$ (i=1 through N). Further, at step S53, the ith category is identified as the category to which the input data for discrimination 2 is classified.

The above conventional signal discrimination device has the following disadvantage. Namely, the distances between the codes for respective categories are determined without any relation to the degrees of affinity between the categories.

FIG. 10 is a diagram showing the distances between the codes for respective categories for the signal discrimination device of FIG. 5. The codes of length L can be represented as points in L dimensional Euclidean space. Thus, in FIG. 10, the codes $C_i$ (i=1 through 3) for three categories are represented as points 35, 36, and 37, respectively, in the 3-dimensional Euclidean space. The distances AB, AC, and BC between the categories A and B, between the categories A and C, and between the categories B and C, respectively, are equal to each other, although, for example, the relation between the categories B and C is less close than the relations between the categories A and B or between the categories A and C, and hence the discrimination or classification error is more grave between the categories B and C than between the categories A and B or the categories A and C. Thus, the probability of an occurrence of a grave classification error (between the categories B and C) is as high as the probability of an occurrence of less grave classification errors (between the categories A and B or between the categories A and C). Classification errors generally occur at random (with equal probability between the categories B and C and between the categories A and B or between the categories A and C), due to the noises in the input data for discrimination 2 or failures of elements within the neural network 8.

SUMMARY OF THE INVENTION

It is therefore an object of this invention to provide a signal discrimination device using a neural network by which the codes for the respective discrimination categories are optimized such that the probabilities of occurrences of grave classification errors are minimized.

The above object is accomplished in accordance with the principle of this invention by a signal discrimination device, using a neural network for classifying input data signals into a plurality of categories, which comprises input means for supplying input data signals; parameter supply means for supplying distinct values of parameters for characterizing respective categories into which the input data signals are classified; adaptive code generator means coupled to the parameter supply means for generating codes for representing the respective categories on the basis of the values of the parameters supplied from the parameter supply means, wherein distances between the codes correspond to degrees of affinity between the respective categories; neural network means coupled to the input means for outputting discrimination signals in response to the data signals, wherein the discrimination signals correspond to the codes for representing the respective categories; and discrimination result judgment means coupled to the neural network means for determining the categories corresponding to respective input data signals by comparing the discrimination signals with the codes for respective categories.

Preferably, the code length L of the codes for representing respective categories is equal to a number M of the parameters; the parameters are numbered from 1 to M; the categories are numbered from 1 to N, N being the number of the categories; and the adaptive code generator means includes: means for determining a minimum $P_{j1}$ and a maximum $P_{j2}$ of jth parameter $P_j$, for respective values of j from 1 to M; and means for determining code $C_i$ for an ith category by:

$$C_{ij} = (P_j - P_{j1})/(P_{j2} - P_{j1})$$

where i ranges from 1 through N and j ranges from 1 through L.

Alternatively, it is preferred that the code length L of the codes for representing respective categories is equal to a number M of the parameters; the parameters are numbered from 1 to M; the categories are numbered from 1 to N, N being the number of the categories; and the adaptive code generator means includes: means for determining a minimum $P_{j1}$, a maximum $P_{j2}$, and a minimum separation $d_j$ of jth parameter $P_j$, for respective values of j from 1 to M; means for determining a code length $L_j$ for the jth parameter by:

$$L_j = \text{INT}((P_{j2} - P_{j1})/d_j)$$

where j ranges from 1 to M and INT() represents rounding fractions up; means for setting a total code length L equal to a sum of $L_j$ for respective values of j from 1 to M; means for determining a partial code $\tilde{c}_j$ for the jth parameter $P_j$ for an ith category by:

$$\tilde{c}_{jk} = \begin{cases} 1 & \text{if } k \leq \text{INT}((P_j - P_{j1})/d_j) \\ 0 & \text{otherwise} \end{cases}$$

where j and k range from 1 to M and from 1 to $L_j$, respectively, and $\tilde{c}_{jk}$ represents a kth component of the partial code $\tilde{c}_j$; and means for determining the total code $C_i$ for representing the ith category by:

$$C_i = \tilde{c}_1 \oplus \tilde{c}_2 \oplus \cdots \oplus \tilde{c}_M$$

where i ranges from 1 to N and a symbol $\oplus$ represents a concatenation operator.

Preferably the signal discrimination device further comprises: learning input data generator means coupled to the parameter supply means for generating input data signals for learning corresponding to the distinct values of the parameters supplied from the parameter supply means; wherein weights of respective nodes of the neural network means are adjusted to output the codes for respective categories in response to the input data signals for learning supplied from the learning input data generator means.

Alternatively, the signal discrimination device further comprises: learning input data selector means, coupled to the input means and the parameter supply means, for selecting input signals for learning corresponding to the distinct values of parameters from the input data signals supplied from the input means; wherein weights of respective nodes of the neural network means are adjusted to output the codes for respective categories in response to the input data signals supplied from the learning input data selector means.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
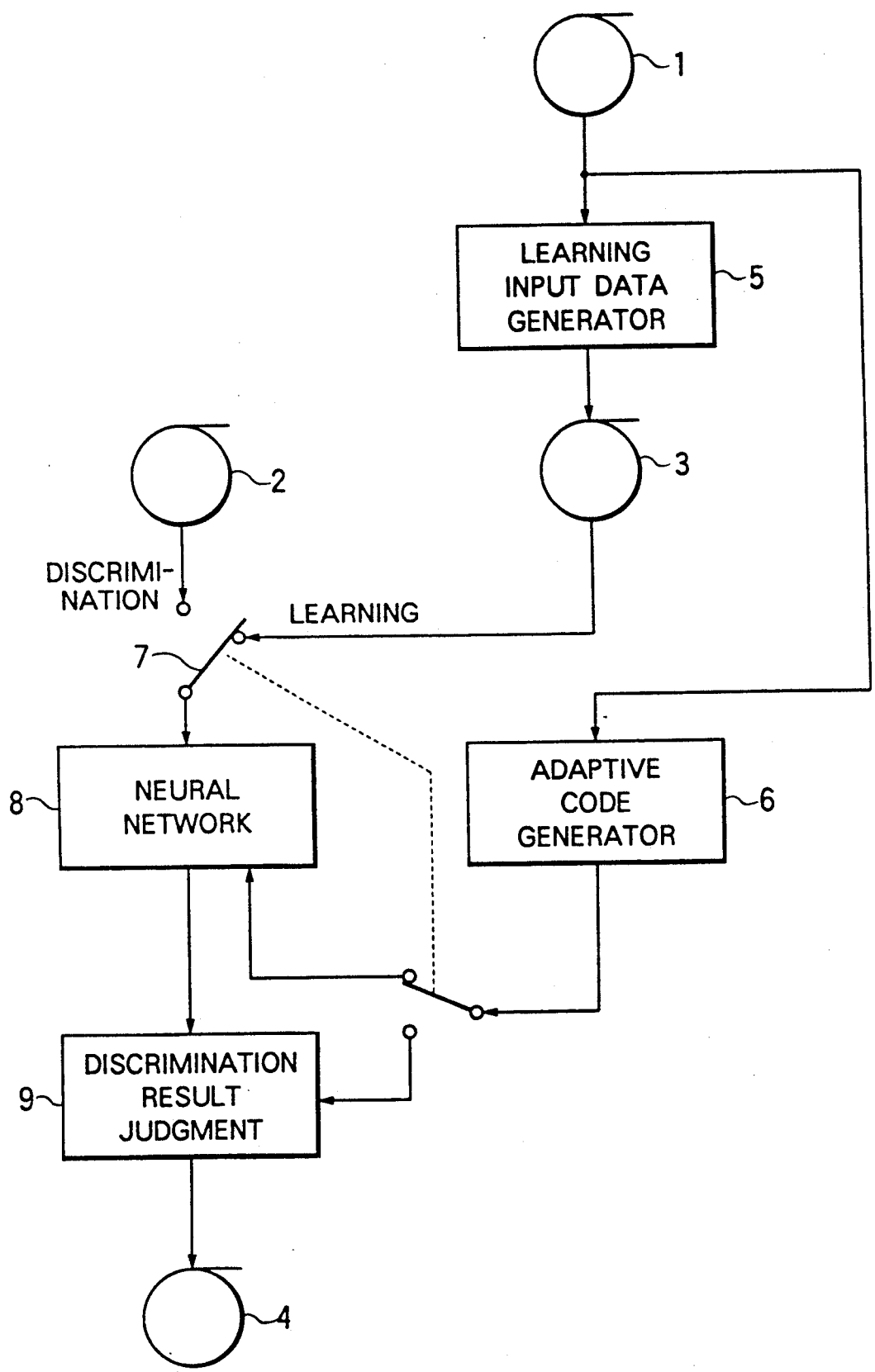
FIG. 1 is a block diagram showing the structure of a signal discrimination device using a neural network according to an embodiment of this invention.

FIG. 1 is a block diagram showing the structure of a signal discrimination device using a neural network according to an embodiment of this invention. The signal discrimination device discriminates, for example, an object from a 2-dimensional array of 100 of 10 times 10 (10×10) pixels formed from a radar reception signal. According to this embodiment of this invention, an object may be classified into nine categories in accordance with the values of two parameters: the number of vertices (a first parameter) and the area of the object in the 2-dimensional array (a second parameter). For simplicity, it may be assumed that the object is classified into nine categories in accordance with the number of vertices (3, 4, and 5) and the area (small, intermediate, and great).

A parameter file 1 contains distinct values of parameters for distinguishing an object. For example, the parameter file 1 includes: three distinct values of the number of vertices, 3, 4, and 5, which are to be distinguished; and three values of area which are representative of the small, intermediate, and great area range, respectively. The area of an object is proportional to the number of pixels of a 2-dimensional array of 100 pixels. Then, the above three representative values of area are selected from 1 through 100 for the small, intermediate, and great area range, respectively.

The parameter file 1 further stores information on the degree of affinity (or closeness) of the values of respective parameters. In the case of the first parameter representing the number of vertices, 3, 4, and 5, the degree of affinity between the values 3 and 4 may be estimated at 1.5, while that between the values 4 and 5 may be estimated at 1. This means that a rectangular object is more akin to a pentagonal object than a triangular object is to a rectangular object. Alternatively, the degrees of affinity between the values 3 and 4 and between 4 and 5 may both be estimated at 1. In a similar manner, the parameter file 1 stores affinity information on the three representative values of the second parameter.

A file for input data for discrimination 2 stores input data for discrimination, which consists, for example, of a number of 2-dimensional array image data frames obtained from radar reception signals. Each 2-dimensional array image frame consists of 100 pixels of 10 times 10 (10×10) pixels. A file for input data for learning 3 stores input data for learning, which consists, for example, of a number of 2-dimensional array image frames generated by a learning input data generator means 5 for respective sets of parameters. A data file for discrimination result judgement 4 stores the discrimination result judgments obtained by a discrimination result judgment means 9. The learning input data generator means 5 generates (randomly, for example) instances of the input data for learning corresponding to the respective sets of parameter values supplied from the parameter file 1.

Figure 6:
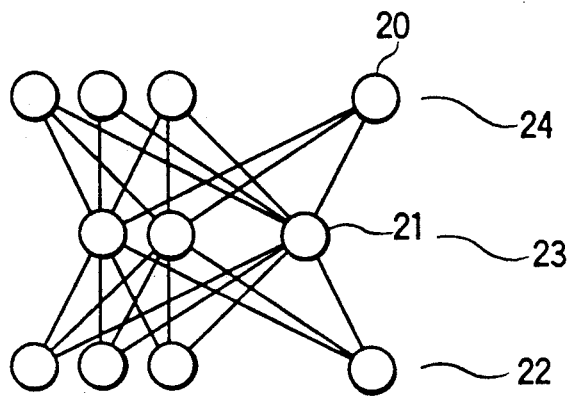
FIG. 6 is a diagram showing the structure of the neural network.
Figure 7:
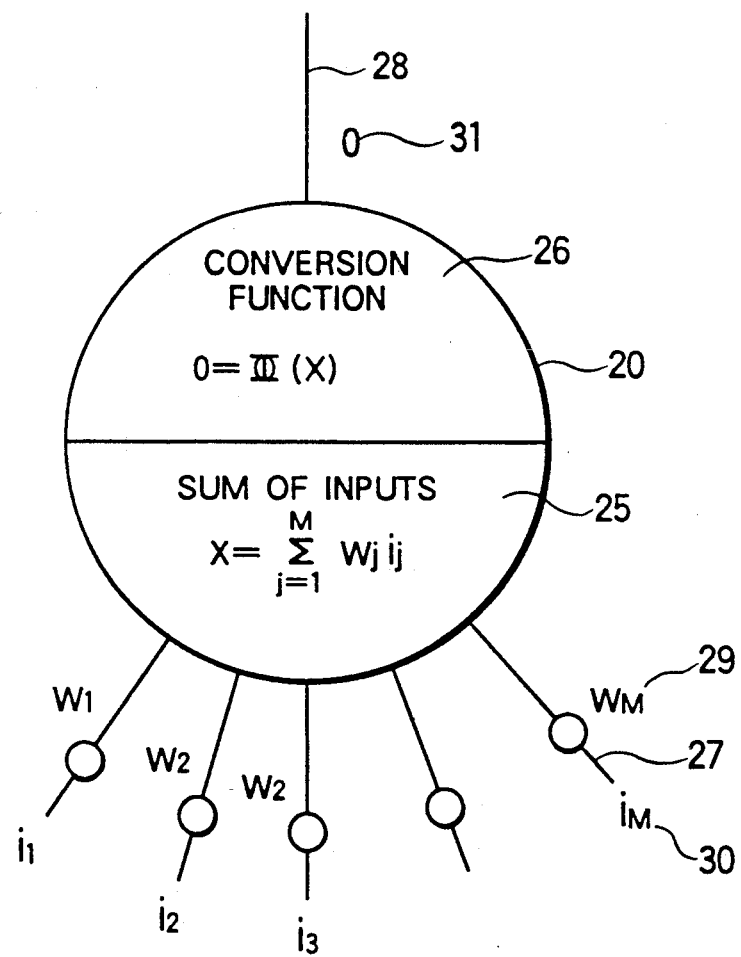
FIG. 7 is a diagram showing the relationship of the inputs and an output component of the neural network.
Figure 8:
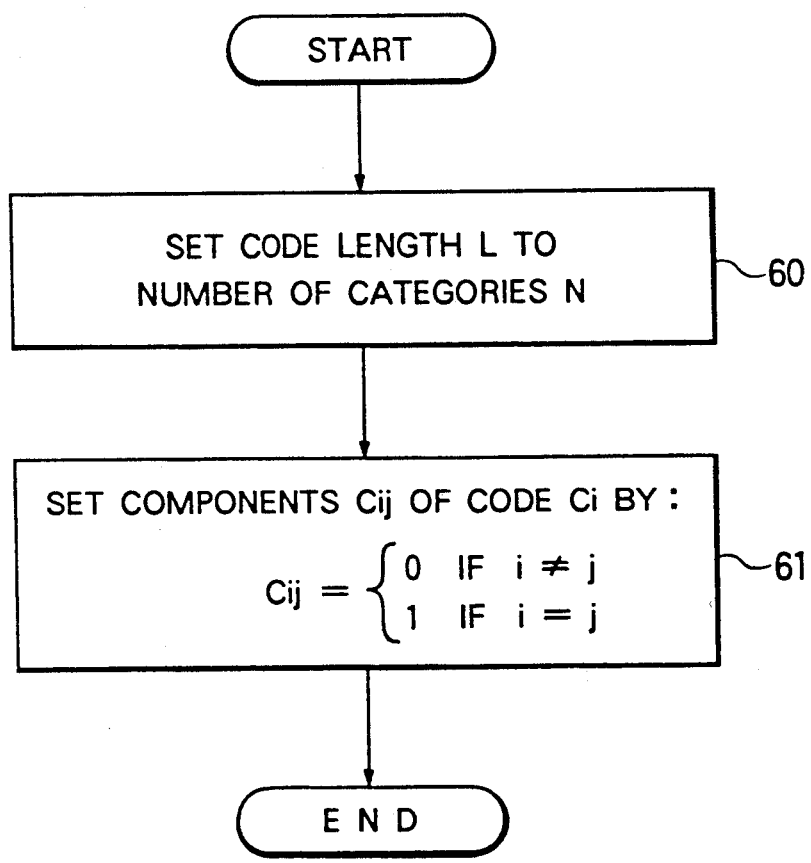
FIG. 8 is a flowchart showing the procedure by which the codes for respective categories are generated in the code generator means of FIG. 5.

As shown in FIG. 6 the neural network 8 includes: an input layer 22, an intermediate layer 23, and an output layer 24. The input layer 22 includes, for example, 100 elements corresponding to the number of pixels of each frame of 2-dimensional image array. The output layer 24 includes a number of elements corresponding to the code length L.

The neural network 8 is selectively connected to the input data for discrimination 2 and the input data for learning 3 via the learning/discrimination change-over switch 7. The output of the adaptive code generator means 6 coupled to the parameter file 1 is selectively coupled via the interlocked learning/discrimination change-over switch 7 to the neural network 8 and the discrimination result judgment means 9.

During the training or learning stage, the learning/discrimination change-over switch 7 is switched to the learning side. First, on the basis of the parameter values and affinity information supplied from the parameter file 1, the adaptive code generator means 6 generates a system of codes for representing respective categories.

Figure 3:
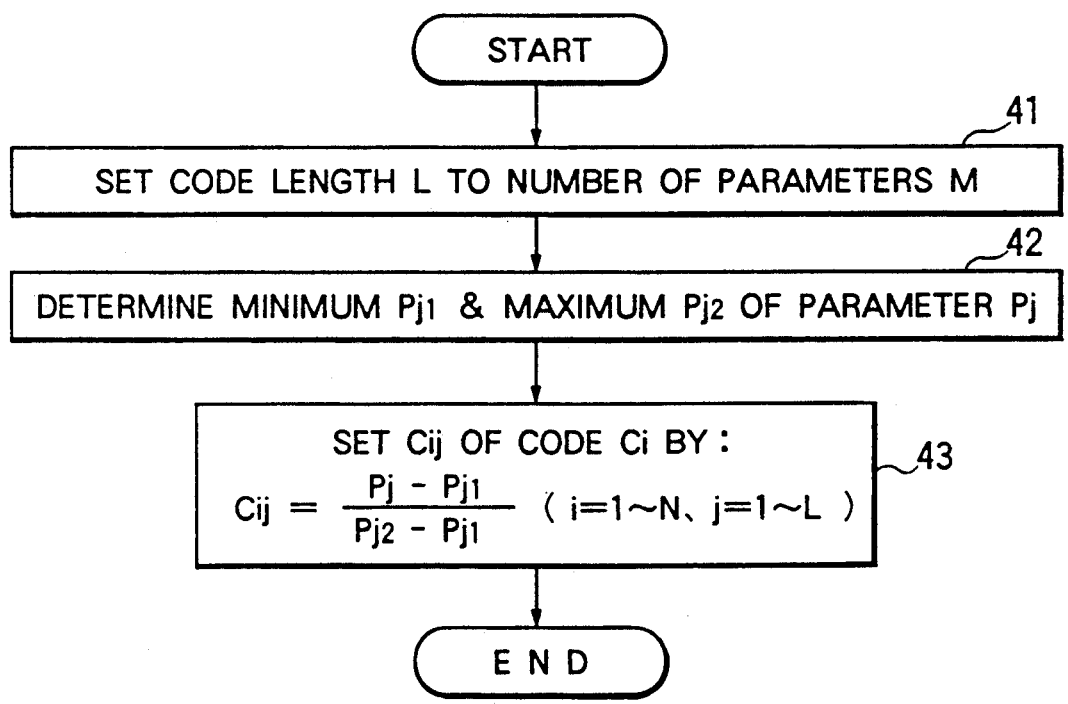
FIG. 3 is a flowchart showing a procedure by which the codes for respective categories are generated by the adaptive code generator means according to this invention.

FIG. 3 is a flowchart showing a procedure by which the codes for respective categories are generated by the adaptive code generator means according to this invention. At step S41, the code length L is set equal to the number of parameters M:L=M. Thus, when the number M of parameters is equal to two, the code length L is also equal to two.

Further, if the values of parameters stored in the parameter file 1 are not proportional to the degrees of affinity among them, the modified representative values of the parameters which take into consideration the degrees of affinity between the respective values of the parameters are determined. Thus, for the first parameter for the number of vertices (3, 4, and 5) of an object, the three modified values taking the degrees of affinity into consideration may be 0, 3, and 5, respectively, such that the separations between them are proportional to the degrees of affinity therebetween. The modified values for the jth parameter are represented by $P_j$. When, however, the original values of parameters are proportional to the degrees of affinity, this modification procedure of the parameters may be omitted. Then $P_j$ represents the original values of the jth parameter.

At step S42, the minimum $P_{j1}$ and the maximum $P_{j2}$ of the respective parameters $P_j$ are determined. (as described above, the parameters $P_j$ may be the original or the modified parameters, depending on the affinity information on these parameters.) Thus, for the first and the second parameters $P_1$ and $P_2$, for example, the respective minimum $P_{11}$ and $P_{21}$ and the respective maximum $P_{12}$ and $P_{22}$ are determined.

Next, at step S43, the jth component $C_{ij}$ of the code $C_i$ for representing the ith category is calculated by:

$$C_{ij} = (P_j - P_{j1})/(P_{j2} - P_{j1})$$

where i=1 through N and j=1 through L.

The following TABLE 2 shows an example of the sets of values of the first and the second parameter for the respective categories. For simplicity, it is assumed in TABLE 2 that the three values of the first and the second modified parameters $P_1$ and $P_2$ are both 0, 1, and 2.

TABLE 2

| 2nd par./1st par. | 0 | 1 | 2 |
|---|---|---|---|
| 0 | category 1 | category 2 | category 3 |
| 1 | category 4 | category 5 | category 6 |

TABLE 2-continued

| 2nd par./1st par. | 0 | 1 | 2 |
|---|---|---|---|
| 2 | category 7 | category 8 | category 9 |

The above TABLE 2 shows, for example, that the values of parameters: $P_1=0$, $P_2=0$ correspond to category 1; the values of parameters: $P_1=1$, $P_2=0$ correspond to category 2; the values of parameters: $P_1=2$, $P_2=0$ correspond to category 3.

It is assumed that the values of parameters are as shown in TABLE 2. Then, at step S42 in FIG. 3, it is determined that $P_{11}=0$, $P_{12}=2$, $P_{21}=0$, and $P_{22}=2$.

Further, at step S43, the codes $C_1$ through $C_9$ are determined. For example, the components of the code $C_1$ for the category 1 are determined as following:

$$C_{11} = (P_1 - P_{11})/(P_{12} - P_{11})$$
$$= (0 - 0)/(2 - 0)$$
$$= 0.0$$

$$C_{12} = (P_2 - P_{21})/(P_{22} - P_{21})$$
$$= (0 - 0)/(2 - 0)$$
$$= 0.0$$

Similarly, the components of the code $C_2$ for the category 2 are determined as following:

$$C_{21} = (P_1 - P_{11})/(P_{12} - P_{11})$$
$$= (1 - 0)/(2 - 0)$$
$$= 0.5$$

$$C_{22} = (P_2 - P_{21})/(P_{22} - P_{21})$$
$$= (0 - 0)/(2 - 0)$$
$$= 0.0$$

The codes $C_i$ for the other categories are determined in a similar manner. The codes $C_i$ for the nine categories are shown in the following TABLE 3.

TABLE 3

| 2nd par./1st par. | 0 | 1 | 2 |
|---|---|---|---|
| 0 | 0.0 0.0 | 0.0 0.5 | 0.0 1.0 |
| 1 | 0.5 0.0 | 0.5 0.5 | 0.5 1.0 |
| 2 | 1.0 0.0 | 1.0 0.5 | 1.0 1.0 |

It is noted that in TABLE 3 the components $C_{ij}$ of the codes $C_i$ are shown from right to left, the first component appearing at the rightmost position. Thus, the first component $C_{i1}$ is shown at the right and the second component is shown at the left column in TABLE 3. This scheme of representing the components $C_{ij}$ of the codes $C_i$ is followed throughout this specification.

The system of codes $C_i$ determined via the procedure of FIG. 3 for representing the respective categories is optimally adapted for representing the categories. Namely, the degrees of affinity between the categories are reflected in the distances between the respective codes, such that the probability of occurrences of grave errors is reduced.

When the codes $C_i$ for the respective discrimination categories are determined as described above, the learning/discrimination change-over switch 7 is switched to the learning side and the neural network 8 is trained to output codes which are (approximately) equal to the codes for respective categories. This learning procedure is effected in accordance with the back propagation algorithm as described in the articles cited in the above mentioned article (1):

(2) G. Vrckovnik, T. Chung, C. R. Carter: "An Application of Neural Networks to Impulse Radar Waveforms from Asphalt-Covered Bridge Decks", Proceedings of International Joint Conference on Neural Networks, Vol II, pp. 453–456, Washington D.C., 1990, (3) G. Vrckovnik, T. Chung, C. R. Carter: "Classification of Impulse Radar Waveform Using Neural Networks", submitted for publication in IEEE Transactions on Aerospace and Electronic Systems, December 1989 and (4) G. Vrckovnik, T. Chung, C. R. Carter: "Classifying Impulse Radar Waveforms Using Principal Components Analysis and Neural Networks", submitted to International Joint Conference on Neural Networks, San Diego, Calif., June 1990.

Alternatively, the neural network 8 is trained in accordance with the radial basis function algorithm as taught by the article (1) or by:

(5) S. Renals, R. Rohwer: "Phoneme Classification Experiments Using Radial Basis Functions", Proceedings of International Joint Conference on Neural Networks, Vol I, pp. 461–467, 1989, (6) D. Lowe: "Adaptive Radial Basis Function Nonlinearities and the Problem of Generalization", IEE International Conference on Artificial Neural Networks, pp. 461–467, 1989.

(7) S. Haykin: "Neural Network Theory", Course Notes, Department of Electrical and computer Engineering, McMaster University, Hamilton, Ontario, 1989, The disclosures of these articles (1) through (7) are incorporated herein by reference.

During the learning stage, the weights 29 of the respective nodes of the neural network 8 are modified via the back propagation algorithm or the radial basis function algorithm, etc., such that the codes as near to the codes for respective categories as possible are output from the neural network 8 in response to the input data for learning 3.

In the case where the input data for discrimination 2 stores a plurality of 2-dimensional array image frames each consisting of 100 pixels as described above, the input layer 22 (see FIG. 6) of the neural network 8 includes 100 input elements or nodes. The maximum and the minimum value of the outputs 0 of the output elements 20 of the output layer 24 of the neural network 8 is represented by 1 and 0, respectively. Further, the output layer 24 includes output elements or nodes whose number is equal to the code length L. The code length L is equal to two in the above example. Each instance of the input signal consisting of 100 pixels is converted via the neural network 8 into a discrimination signal which consists of the values corresponding to the components of the codes for the respective categories. In the above case, the output layer 24 of the neural network 8 is trained to output the values for two parameters $P_1$ and $P_2$ in response to the input data for learning 3. During the learning stage, the neural network 8 receives from the file for input data for learning 3 a number of instances of input data each consisting, for example, of a 2-dimensional image frame of 100 pixels. Further, the neural network 8 receives from the adaptive code generator means 6 the codes corresponding to the respective instances of input data (the 2-dimensional image frames). On the basis of these inputs from the file for input data for learning 3 and the adaptive code generator means 6, the weights of the neural network 8 are adjusted by means of the above mentioned algorithms.

Figure 9:
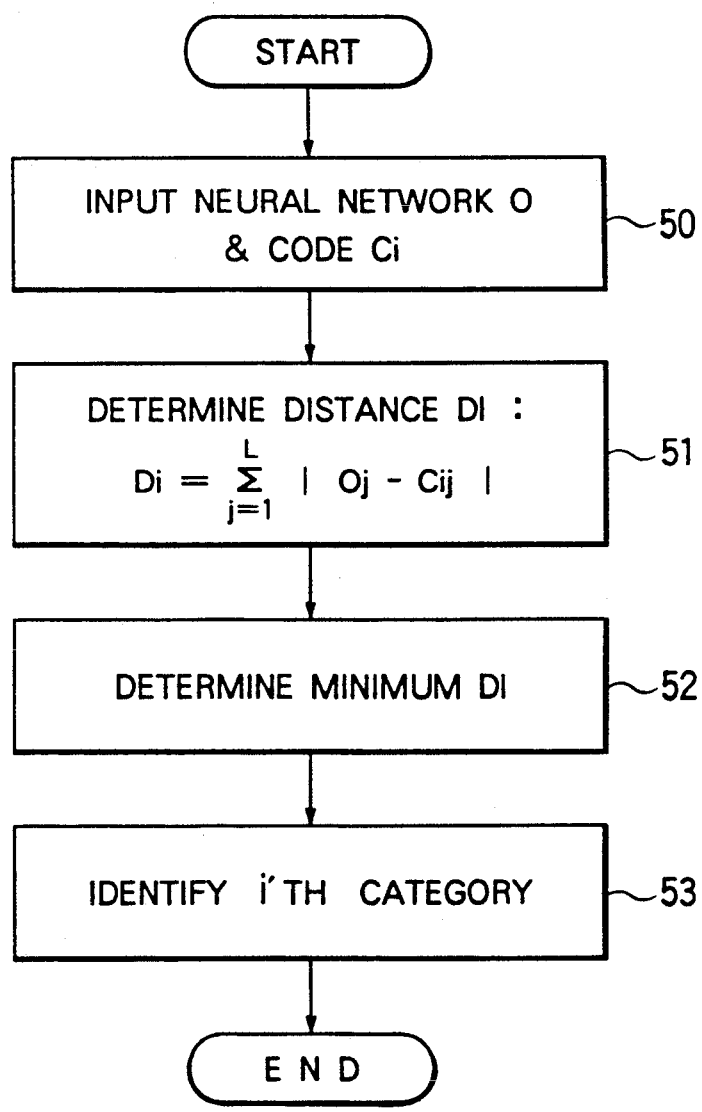
FIG. 9 is a flowchart showing the procedure by which the discrimination result judgment means of FIG. 5 discriminates the categories in response to the outputs of the neural network.
Figure 10:
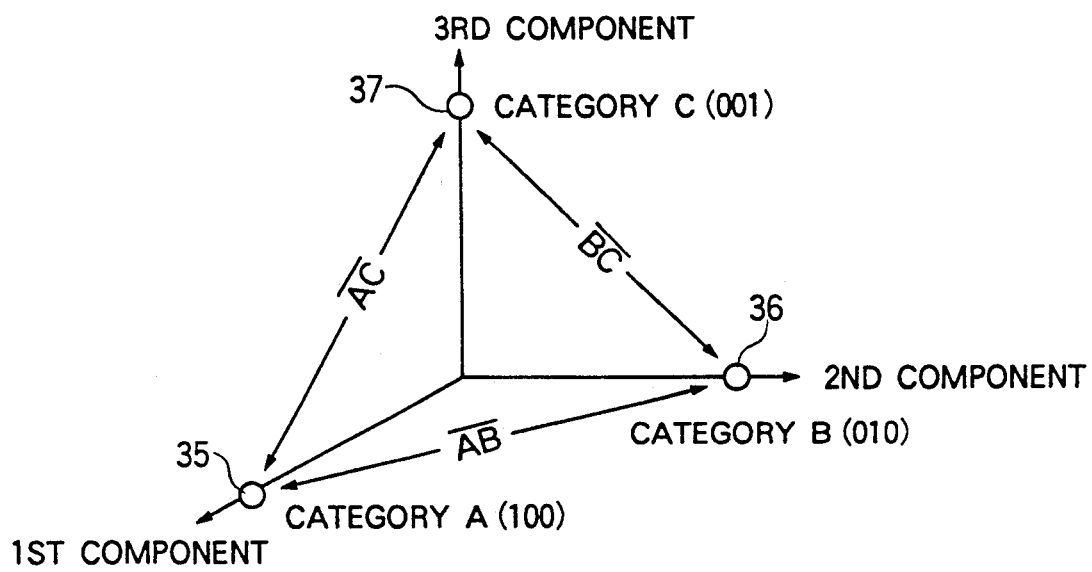
FIG. 10 is a diagram showing the distances between the codes for respective categories for the signal discrimination device of FIG. 5.

When the training of the neural network 8 is completed, the learning/discrimination change-over switch 7 is switched to the discrimination side. In response to the input data for discrimination the neural network 8 outputs the discrimination signal. For example, in response to each input image frame of 100 pixels, the neural network 8 generates an output $O_j$ whose values correspond to the components $C_{ij}$ of the codes $C_i$ for representing the respective categories. Then, the discrimination result judgment means 9 identifies the category number I for each instance of the input data for discrimination (each set of 100 pixel inputs constituting a 2-dimensional image frame) in accordance with the procedure described above by reference to FIG. 9.

Figure 4:
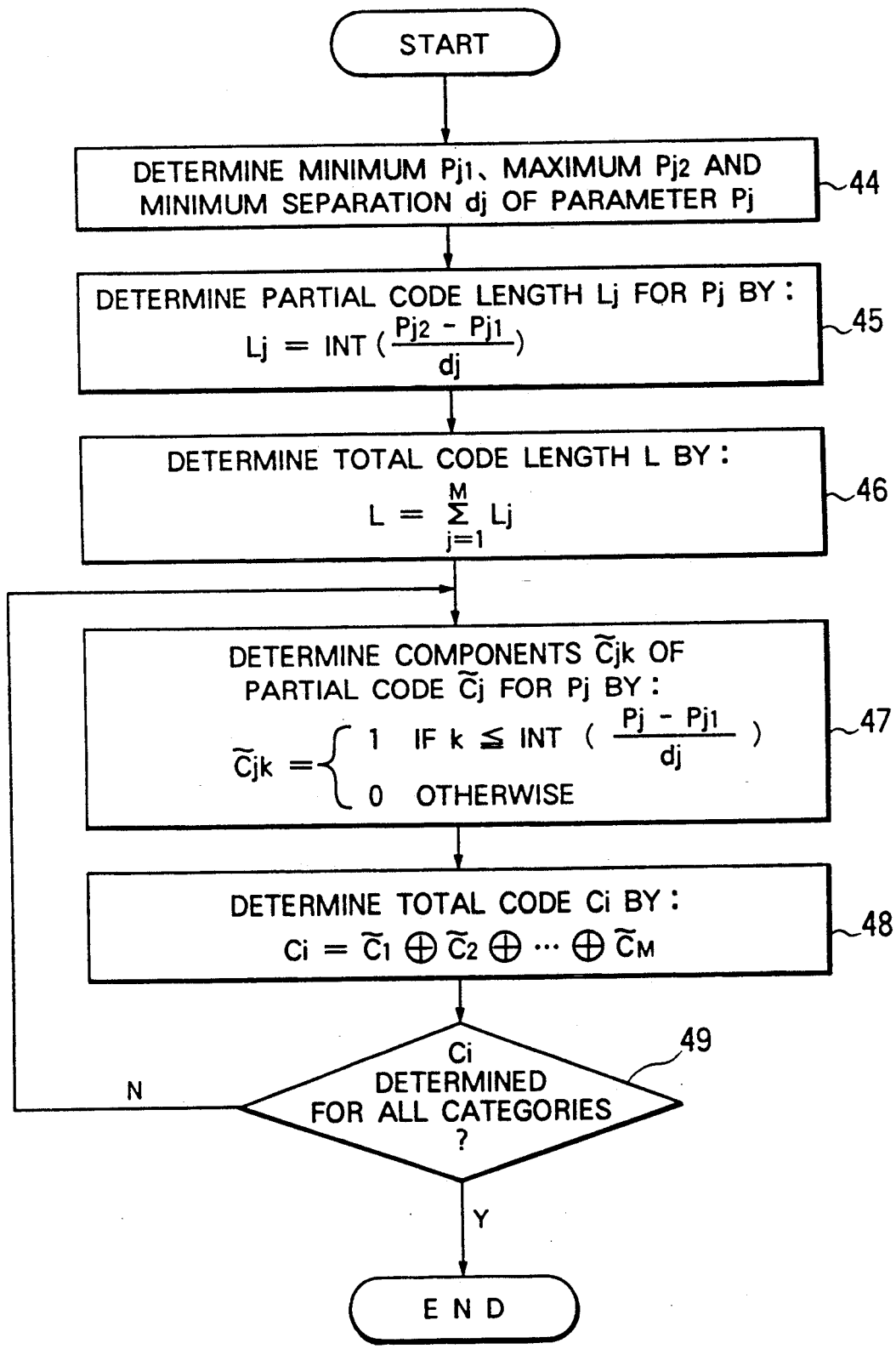
FIG. 4 is a flowchart showing another procedure by which the codes for respective categories are generated by the adaptive code generator means according to this invention.
Figure 5:
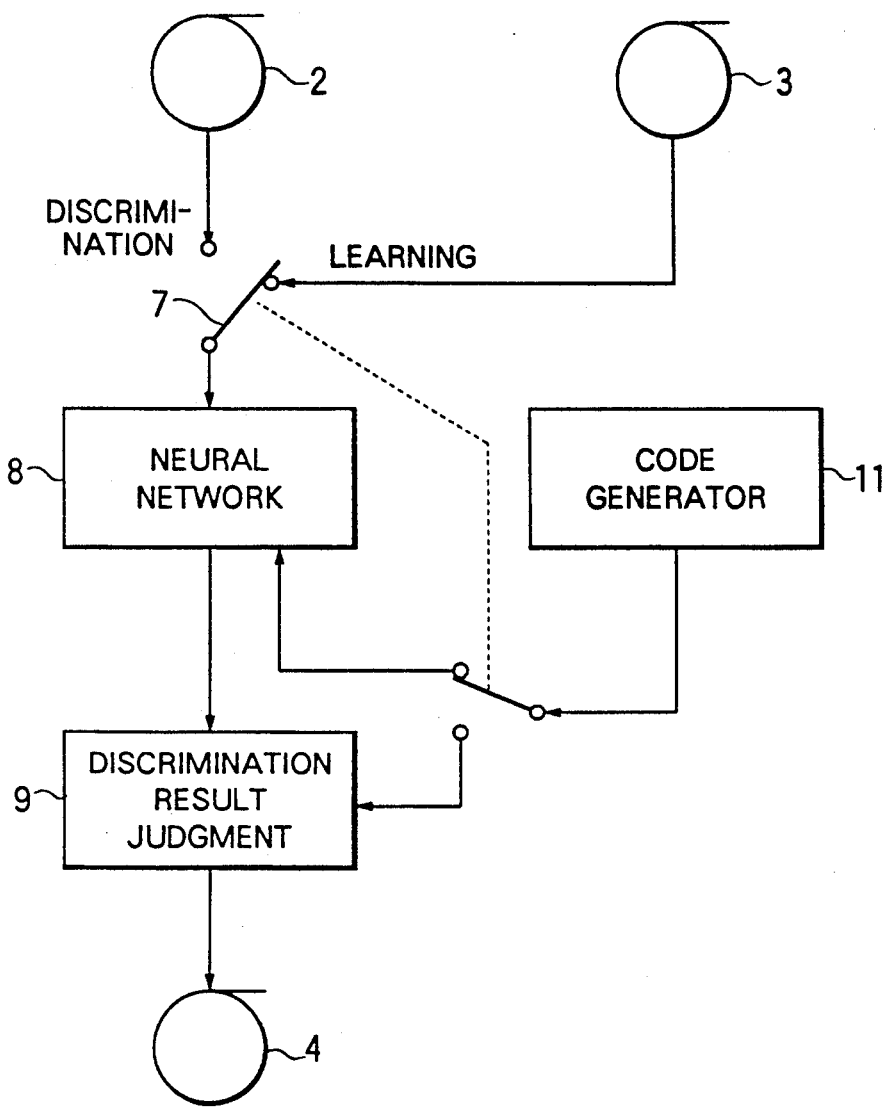
FIG. 5 is a block diagram showing the structure of a conventional signal discrimination device using a neural network.

FIG. 4 is a flowchart showing another procedure by which the codes for respective categories are generated by the adaptive code generator means according to this invention. At step S44, the adaptive code generator means 6 determines the minimum $P_{j1}$, the maximum $P_{j2}$ and the minimum separation dj of the respective parameters $P_j$, (where j=1 through M, M being the number of parameters).

At step S45, the partial code length $L_j$ for the respective parameters $P_j$ is determined by the formula:

$$L_j = \text{INT}((P_{j2} - P_{j1})/d_j)$$

where INT() represents rounding fractions up (the fractions are counted as one; for example, INT(1.3)=2).

At step S46, the total code length L is determined by:

$$L = \sum_{j=1}^{M} L_j$$

Further, at step S47, the components $\tilde{c}_{jk}$ of partial code $\tilde{c}_j$ for the jth parameter $P_j$ is determined by:

$$\tilde{c}_{jk} = \begin{array}{l} 1 \text{ if } k \leq \text{INT}((P_j - P_{j1})/d_j) \\ 0 \text{ otherwise} \end{array}$$

where k ranges from 1 to $L_j$, and $\tilde{c}_{jk}$ represents the kth component of the partial code $\tilde{c}_j$.

At step S48, the total code $C_i$ for representing the ith category is determined by:

$$C_i = \tilde{c}_1 \oplus \tilde{c}_2 \oplus \cdots \oplus \tilde{c}_M$$

where the symbol $\oplus$ represents concatenation operator (the code $C_i$ is the concatenation of $\tilde{c}_1, \tilde{c}_2, \cdots, \tilde{c}_M$).

At step S49 it is judged whether or not the code $C_i$ has been determined for all the categories. If the judgment is negative, the control returns to step S47 to repeat the determination of the respective codes $C_i$ until all the codes $C_i$ for the discrimination categories are determined. When the judgment at step S49 finally becomes affirmative, the procedure is terminated.

If the input data for discrimination are classified into nine categories in accordance with the values of the first and second parameters $P_1$ and $P_2$ as shown in TABLE 2, the codes $C_i$ are determined as follows in accordance with the procedure of FIG. 4.

At step S44, the minimum $P_{11}$, the maximum $P_{12}$, and the minimum separation $d_1$ of the first parameter $P_1$ are determined: $P_{11}=0$, $P_{12}=2$, $d_1=1$. Further, the minimum $P_{21}$, the maximum $P_{22}$, and the minimum separation $d_2$ of the second parameter $P_2$ is determined: $P_{21}=0$, $P_{22}=2$, $d_2=1$.

At step S45, the code length $L_1$ for the first parameter $P_1$ is determined by:

$$\begin{aligned} L_1 &= \text{INT}((P_{12} - P_{11})/d_1) \\ &= \text{INT}((2 - 0)/1) \\ &= 2 \end{aligned}$$

Similarly, the code length $L_2$ for the second parameter $P_2$ is determined by:

$$\begin{aligned} L_2 &= \text{INT}((P_{22} - P_{21})/d_2) \\ &= \text{INT}((2 - 0)/1) \\ &= 2 \end{aligned}$$

At step S46, the code length L is calculated by:

$$\begin{aligned} L &= L_1 + L_2 \\ &= 2 + 2 \\ &= 4 \end{aligned}$$

At step S47, the components $\tilde{c}_{1k}$ of partial code $\tilde{c}_1$ for the first parameter $P_1$ is determined by:

$$\tilde{c}_{1k} = \begin{array}{l} 1 \quad \text{if } k \leq \text{INT}((P_1 - P_{11})/d_1) \\ 0 \quad \text{otherwise} \end{array}$$

where $\tilde{c}_{1k}$ represents the first component of the partial code $\tilde{c}_1$ for the first parameter $P_1$.

For example, for the category 1, the value of $P_1$ is equal to 0 ($P_1=0$), such that:
$$\text{INT}((P_1-P_{11})/d_1)=\text{INT}((0-0)/1)=0$$

Thus, the components of the code $\tilde{c}_1$ are given by: $\tilde{c}_{11}=\tilde{c}_{12}=0$, or $\tilde{c}_1=(00)$.

For the category 2 for which $P_1=1$,
$$\text{INT}((P_1-P_{11})/d_1)=\text{INT}((1-0)/1)=1$$

Thus, the values of the code components are given by: $\tilde{c}_{11}=1$ and $\tilde{c}_{12}=0$, such that $\tilde{c}_1=(01)$. (The first component $\tilde{c}_{11}$ comes at the right as remarked above.) The partial code $\tilde{c}_1$ for other categories is determined in a similar manner.

Further, the components $\tilde{c}_{2k}$ of partial code $\tilde{c}_2$ for the second parameter $P_2$ is determined by:

$$c_{2k} = \begin{array}{l} 1 \quad \text{if } k \leq \text{INT}((P_2 - P_{21})/d_2) \\ 0 \quad \text{otherwise} \end{array}$$

where $\tilde{c}_{2k}$ represents the second component of the partial code $\tilde{c}_2$.

For example, for the category 4 for which $P_2=1$, $$\text{INT}((P_2-P_{21})/d_2)=\text{INT}((1-0)/1)=1$$

Thus, $\tilde{c}_{21}=1$ and $\tilde{c}_{22}=0$ such that $\tilde{c}_2=(01)$. (The first component $\tilde{c}_{21}$ is at the right.)

The partial code $\tilde{c}_2$ for the other categories is determined in a similar manner.

At step S48 the partial codes for respective parameters $P_1$ and $P_2$ are concatenated to form the total code $C_1$ through $C_9$ for the categories 1 through 9:

$$C_i = \tilde{c}_1 \oplus \tilde{c}_2$$

where $i = 1, 2, \ldots, 9$.

For example, for the category 1 for which $\tilde{c}_1=(00)$ and $\tilde{c}_2=(00)$ as described above, $c_1=(0000)$. For the category 2 for which $\tilde{c}_1=(01)$ and $\tilde{c}_2=(00)$ as described above, $c_2=(0100)$. The codes $C_i$ for other categories are determined in a similar manner.

The following TABLE 4 shows the codes $C_i$ for the nine categories as determined in accordance with the above procedure.

TABLE 4

| 2nd par./1st par. | 0 | 1 | 2 |
|---|---|---|---|
| 0 | 0000 | 0100 | 1100 |
| 1 | 0001 | 0101 | 1101 |
| 2 | 0011 | 0111 | 1111 |

By means of the procedure shown in FIG. 4, the values of components of the codes $C_i$ are set equal to either the minimum output value 0 or the maximum output value 1 of the output elements of the neural network 8. Thus, the distances or separations among the codes can be increased, to minimize the probability of occurrences of error classification due, for example, to noises in the input data for discrimination.

Figure 2:
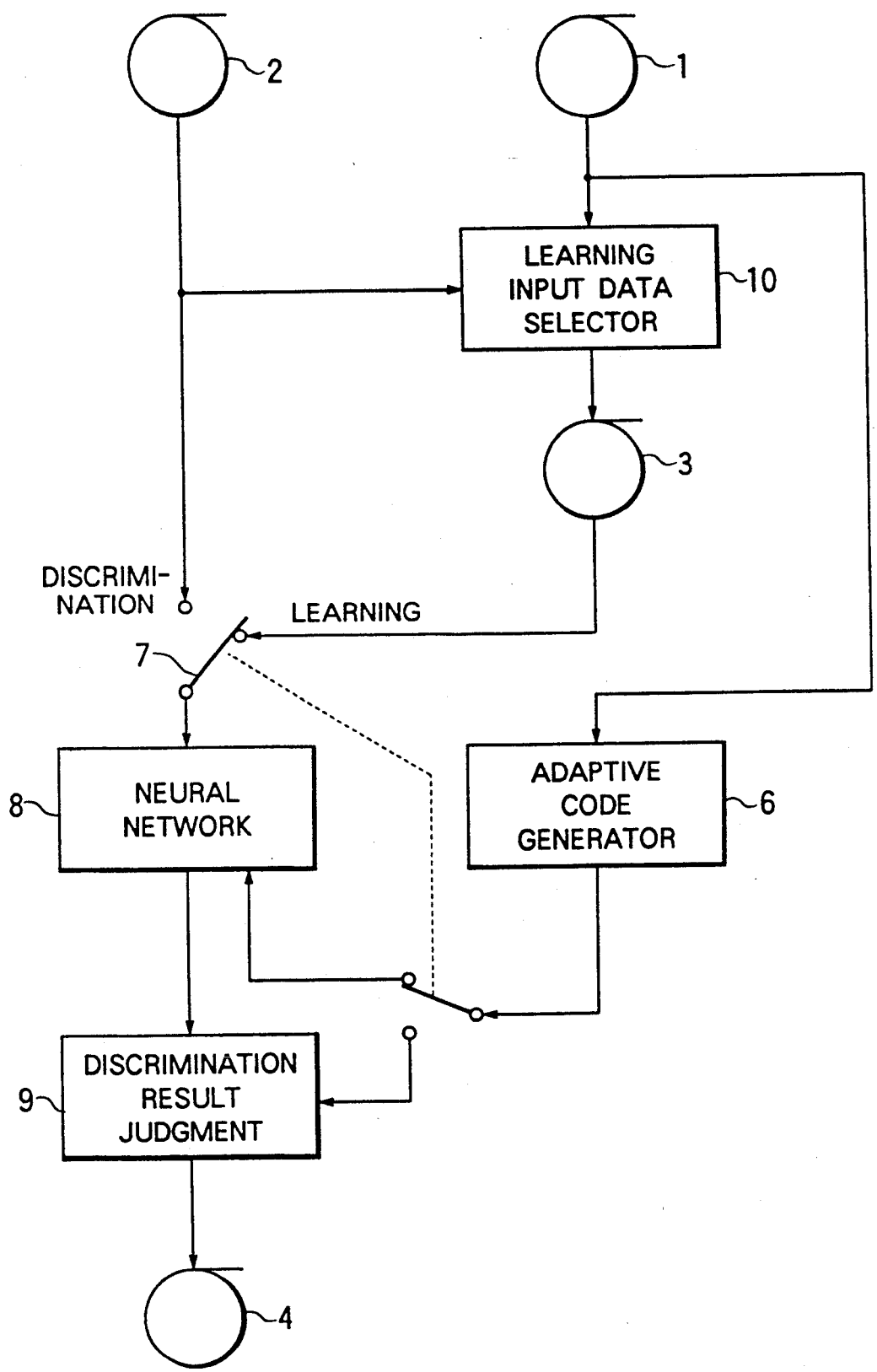
FIG. 2 is a block diagram showing the structure of a signal discrimination device using a neural network according to another embodiment of this invention.

FIG. 2 is a block diagram showing the structure of a signal discrimination device using a neural network according to another embodiment of this invention. Instead of the learning input data generator means 5 of FIG. 1, the signal discrimination device of FIG. 2 includes a learning input data selector means 10 having inputs coupled to the parameter file 1 and the file for input data for discrimination 2. During the learning stage, in response to the parameter values supplied from the parameter file 1, the learning input data selector means 10 selects instances of input data for discrimination corresponding to the values of the parameters and supplies them to the file for the input data for learning 3. For example, if the first parameter represents the number of vertices (3, 4, and 5) and the second parameter represents the area (small, intermediate, and great) as described above, the learning input data selector means 10 selects from the file of input data for discrimination 2 those instances of image frames which have the number of vertices and the area indicated by the values of the parameters supplied from the parameter file 1. The instances of the input data for discrimination selected by the learning input data selector means 10 are output to the file for the input data for learning 3. Otherwise, the signal discrimination device of FIG. 2 is similar to that of FIG. 1.

In the case of the signal discrimination device of FIG. 2, the input data for learning is selected from the input data for discrimination 2 by the learning input data selector means 10. Thus, the input data for learning consist of actual data obtained from radar reception signals instead of the artificially created data generated by the learning input data generator means 5.

What is claimed is:

1. A signal discrimination device using a neural network for classifying input data signals into a plurality of categories, said signal discrimination device comprising:
  input means for supplying input data signals;
  parameter supply means for supplying distinct values of parameters for characterizing respective categories into which said input data signals are classified;
  adaptive code generator means coupled to said parameter supply means to receive the distinct values of parameters supplied from said parameter supply means, and for generating codes for representing said respective categories on the basis of said values of said parameters supplied from said parameter supply means, wherein distances between said codes correspond to degrees of affinity between said respective categories;
  neural network means coupled to said input means and responsive to said codes from said adaptive code generator means for outputting discrimination signals in response to said input data signals, wherein said discrimination signals correspond to said codes for representing said respective categories; and
  discrimination result judgment means coupled to said neural network means and responsive to said codes for respective categories from said adaptive code generator, for determining said categories corresponding to respective input data signals by comparing said discrimination signals with said codes for respective categories.

2. A signal discrimination device as claimed in claim 1, wherein a code length L of said codes for representing respective categories is equal to a number M of said parameters; said parameters are numbered from 1 to M; said categories are numbered from 1 to N, N being the number of said categories; and said adaptive code generator means includes:
  means for determining a minimum $P_{j1}$ and a maximum $P_{j2}$ of jth parameter $P_j$, for respective values of j from 1 to M; and
  means responsive to said means for determining a minimum P.sub.j1 and a maximum P.sub.j2 for determining code $C_i$ for an ith category by:

$$C_{ij} = (P_j - P_{j1})/(P_{j2} - P_{j1})$$

where i ranges from 1 through N and j ranges from 1 through L.

3. A signal discrimination device as claimed in claim 1, wherein a code length L of said codes for representing respective categories is equal to a number M of said parameters; said parameters are numbered from 1 to M; said categories are numbered from 1 to N, N being the number of said categories; and said adaptive code generator means includes:
  means for determining from the distinct values of parameters supplied from said parameter supply means a minimum $P_{j1}$, a maximum $P_{j2}$, and a minimum separation $d_j$ of a jth one of said parameters, $P_j$, for respective values of j from 1 to M;
  means responsive to said means for determining a minimum for determining a code length $L_j$ for said jth parameter by:

$$L_j = \text{INT}((P_{j2} - P_{j1})/d_j)$$

where j ranges from 1 to M and a function INT() represents rounding fractions up;

means responsive to said means for determining a code length for setting a total code length L equal to a sum of $L_j$ for respective values of j from 1 to M;
  means responsive to said means for determining a minimum for determining a partial code $\tilde{c}_j$ for said jth parameter $P_j$ for an ith category by:

$$\tilde{c}_{jk} = 1 \text{ if } k \leq \text{INT}((P_j - P_{j1})/d_j)$$
$$0 \text{ otherwise}$$

where j and k range from 1 to M and from 1 to $L_j$, respectively, and $\tilde{c}_{jk}$ represents a kth component of said partial code $\tilde{c}_j$; and
  means responsive to said means for determining a partial code for determining a total code $C_i$ for representing said ith category by:

$$C_i = \tilde{c}_1 \oplus \tilde{c}_2 \oplus \cdots \oplus \tilde{c}_m$$

where i ranges from 1 to N and a symbol $\oplus$ represents a concatenation operator.

4. A signal discrimination device as claimed in claim 1, further comprising:
  learning input data generator means coupled to said parameter supply means for generating input learning data signals corresponding to said distinct values of said parameters supplied from said parameter supply means said neural network being responsive to said input learning data signals;
  wherein weights of respective nodes of said neural network means are adjusted to output said codes for respective categories in response to said input learning data signals supplied from said learning input data generator means.

5. A signal discrimination device as claimed in claim 1, further comprising:
  learning input data selector means, coupled to said neural network, said input means and said parameter supply means, for selecting between input learning signals which are obtained from said input data signals based on said distinct values of parameters and said input data signals supplied from said input means to provide a selection to the neural network;
  wherein weights of respective nodes of said neural network means are adjusted to output said codes for respective categories in response to said input learning signals supplied from said learning input data selector means.

6. A signal discrimination device using a neural network for classifying input data signals into a plurality of categories, said signal discrimination device comprising:
  input means for supplying input data signals;
  parameter supply means for supplying distinct values of parameters for characterizing respective categories into which said input data signals are classified;
  adaptive code generator means coupled to said parameter supply means to receive the distinct values of parameters supplied from said parameter supply means, and for generating codes for representing said respective categories on the basis of said values of said parameters supplied from said parameter supply means, wherein distances between said codes correspond to degrees of affinity between said respective categories;
  neural network means coupled to said input means for outputting discrimination signals in response to said input data signals, wherein said discrimination signals correspond to said codes for representing said respective categories;

discrimination result judgment means coupled to said neural network means for determining said categories corresponding to respective input data signals by comparing said discrimination signals with said codes for respective categories; and wherein a code length L of said codes for representing respective categories is equal to a number M of said parameters; said parameters are numbered from 1 to M; said categories are numbered from 1 to N, N being the number of said categories; and said adaptive code generator means includes:

means for determining a minimum $P_{j1}$ and a maximum $P_{j2}$ of jth parameter $P_j$, for respective values of j from 1 to M; and means responsive to said means for determining a minimum $P_{j1}$ and a maximum $P_{j2}$ for determining code $C_i$ for an ith category by:

$$C_{ij}=(P_j-P_{j1})/(P_{j2}-P_{j1})$$

where i ranges from 1 through N and j ranges from 1 through L.

7. A signal discrimination device using a neural network for classifying input data signals into a plurality of categories, said signal discrimination device comprising:

input means for supplying input data signals;

parameter supply means for supplying distinct values of parameters for characterizing respective categories into which said input data signals are classified;

adaptive code generator means coupled to said parameter supply means to receive the distinct values of parameters supplied from said parameter supply means, and for generating codes for representing said respective categories on the basis of said values of said parameters supplied from said parameter supply means, wherein distances between said codes correspond to degrees of affinity between said respective categories;

neural network means coupled to said input means for outputting discrimination signals in response to said input data signals, wherein said discrimination signals correspond to said codes for representing said respective categories;

discrimination result judgment means coupled to said neural network means for determining said categories corresponding to respective input data signals by comparing said discrimination signals with said codes for respective categories; and wherein a code length L of said codes for representing respective categories is equal to a number M of said parameters; said parameters are numbered from 1 to M; said categories are numbered from 1 to N, N being the number of said categories; and said adaptive code generator means includes:

means for determining from the distinct values of parameters supplied from said parameter supply means a minimum $P_{j1}$, a maximum $P_{j2}$, and a minimum separation $d_j$ of a jth one of said parameters, $P_j$, for respective values of j from 1 to M;

means responsive to said means for determining a minimum for determining a code length $L_j$ for said jth parameter by:

$$L_j=\text{INT}((P_{j2}-P_{j1})/d_j)$$

where j ranges from 1 to M and a function INT() represents rounding fractions up;

means responsive to said means for determining a code length for setting a total code length L equal to a sum of $L_j$ for respective values of j from 1 to M;

means responsive to said means for determining a minimum for determining a partial code $\tilde{c}_j$ for said jth parameter $P_j$ for an ith category by:

$$\tilde{c}_{jk} = \begin{cases} 1 & \text{if } k \leq \text{INT}((P_j - P_{j1})/d_j) \\ 0 & \text{otherwise} \end{cases}$$

where j and k range from 1 to M and from 1 to $L_j$, respectively, and $\tilde{c}_{jk}$ represents a kth component of said partial code $\tilde{c}_j$; and means responsive to said means for determining a partial code for determining a total code $C_i$ for representing said ith category by:

$$C_i=\tilde{c}_1\oplus\tilde{c}_2\oplus\cdots\oplus\tilde{c}_m$$

where i ranges from 1 to N and a symbol $\oplus$ represents a concatenation operator.

* * *